United States Patent
Finan et al.

(10) Patent No.: US 7,129,822 B2
(45) Date of Patent: Oct. 31, 2006

(54) DEVICES FOR DETECTING THE PRESENCE OF A SOURCE OF POWER

(75) Inventors: Darrick Finan, Cary, NC (US); Jim Thompson, Raleigh, NC (US); Greg Mears, Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 239 days.

(21) Appl. No.: 10/790,961

(22) Filed: Mar. 2, 2004

(65) Prior Publication Data

US 2005/0195090 A1 Sep. 8, 2005

(51) Int. Cl.
*G05B 11/01* (2006.01)

(52) U.S. Cl. .............. 340/310.11; 340/538; 340/693.1; 361/797; 714/14

(58) Field of Classification Search ..............................
340/310.11–310.18, 693.5, 693.1, 628, 521,
340/538, 539, 693.2; 361/797, 724, 624;
363/37, 48, 98; 307/66; 714/14; 221/7;
600/300
See application file for complete search history.

(56) References Cited

U.S. PATENT DOCUMENTS

| | | | | |
|---|---|---|---|---|
| 3,675,038 A * | 7/1972 | Dyer, III | ..................... | 307/66 |
| 5,633,789 A | 5/1997 | Kimura et al. | ................ | 363/50 |
| 5,898,389 A * | 4/1999 | Deese et al. | ................ | 340/907 |
| 6,069,412 A | 5/2000 | Raddi et al. | .................. | 307/66 |
| 6,262,899 B1 | 7/2001 | Raddi et al. | .................. | 363/37 |
| 6,310,783 B1 | 10/2001 | Winch et al. | | |
| 6,380,852 B1 * | 4/2002 | Hartman et al. | ............ | 340/521 |
| 6,492,907 B1 * | 12/2002 | McCracken | ................ | 340/628 |
| 6,574,120 B1 * | 6/2003 | Chou | ......................... | 361/819 |
| 6,826,036 B1 * | 11/2004 | Pereira | ...................... | 361/624 |
| 6,894,622 B1 * | 5/2005 | Germagian et al. | ...... | 340/693.5 |
| 2002/0138785 A1 * | 9/2002 | Hammond et al. | ........... | 714/14 |
| 2003/0052770 A1 | 3/2003 | Mansfield, Jr. et al. | . | 340/310.01 |
| 2004/0015340 A1 | 1/2004 | Kadoi et al. | .................. | 703/18 |

FOREIGN PATENT DOCUMENTS

EP 1 005 133 5/2000
WO WO 01/82260 11/2001

OTHER PUBLICATIONS

International Search Report corresponding to PCT/US2005/006339, mailed Jun. 10, 2005.

* cited by examiner

*Primary Examiner*—Brent A. Swarthout
(74) *Attorney, Agent, or Firm*—Myers Bigel Sibley & Sajovec (57) ABSTRACT

An apparatus is provided that includes an uninterruptible power supply (UPS) configured to be connected to a power distribution network. A communications circuit is also provided. The communications circuit is operatively associated with the UPS and operative to generate a power line carrier status signal on the power distribution network. The power line carrier status signal is indicative of a status of power delivered to the power distribution network by the UPS. Related methods of operating such apparatus are also provided.

12 Claims, 4 Drawing Sheets

DEVICES FOR DETECTING THE PRESENCE OF A SOURCE OF POWER

BACKGROUND OF THE INVENTION

The present invention relates to a power supply apparatus and methods of operation thereof, and more particularly, to uninterruptible power supplies (UPSs) and methods of operation thereof.

UPSs are commonly used to provide conditioned and/or auxiliary power to electronic equipment that provides critical functions, such as computer systems, telecommunications systems and medical equipment. Typically, UPSs can provide AC power from a backup source, such as a battery, generator or fuel cell, in the event that a utility power supply fails or becomes degraded.

Power protected outlets, i.e., outlets having access to a backup power (secondary power) source or UPS, are typically indicated using a colored, for example, red, outlet cover. The use of a red outlet cover may be problematic if, for example, the UPS has been connected incorrectly or has been disconnected and/or moved subsequent to the installation of the red outlet cover. There may be no way of knowing if an outlet having a red outlet cover is power protected. The presence and timely operation of a UPS or secondary power source may be critical in, for example, backing up medical equipment in a hospital in the event that a primary source of power is lost.

SUMMARY OF THE INVENTION

Embodiments of the present invention provide a power outlet assembly that includes a frame and a power outlet attached to the frame. The power outlet is configured to be connected to a power distribution network to provide access thereto. An indicator circuit is also attached to the frame and is configured to be coupled to the power distribution network. The indicator circuit is operative to generate a sensory indication responsive to a power line carrier status signal received from the power distribution network.

In some embodiments of the present invention the power line carrier status signal may indicate a source and/or status of energy for the power distribution network and may relate to an uninterruptible power supply (UPS). In certain embodiments of the present invention, the source of energy may include a current source of energy and/or a potential source of energy.

In further embodiments of the present invention, the power line carrier status signal may include a low impact signal. The low impact signal may include at least one of an analog signal and a digital bit stream. In certain embodiments of the present invention, the indicator circuit may include a liquid crystal display (LCD). The LCD may be configured to display a first color responsive to a first state of the power line carrier status signal and display a second color, different from the first color, responsive to a second state of the power line carrier status signal. The indicator circuit may also be an audio circuit.

Further embodiments of the present invention provide a power outlet that includes an indicator circuit. The indicator circuit may be coupled to a power distribution network and configured to generate a sensory indication responsive to a power line carrier status signal received from the power distribution network.

Still further embodiments of the present invention provide a device including a conductive member configured to engage a power contact of a power outlet. An indicator circuit is also provided and is coupled to the conductive member. The indicator circuit may be operative to receive a power line carrier status signal from the engaged power contact and to responsively display an indication of a status of the outlet.

Some embodiments of the present invention provide an apparatus that includes an uninterruptible power supply (UPS) configured to be connected to a power distribution network. A communications circuit is also provided. The communications circuit is operatively associated with the UPS and operative to generate a power line carrier status signal on the power distribution network. The power line carrier status signal is indicative of a status of power delivered to the power distribution network by the UPS.

Further embodiments of the present invention provide an apparatus that includes a communications circuit operative to generate a power line carrier status signal on a power distribution network. The power line carrier status signal identifies a source of power for the power distribution network.

While the present invention is described above primarily with reference devices and apparatus, methods of operating the devices and apparatus are also provided herein.

DETAILED DESCRIPTION OF EMBODIMENTS OF THE INVENTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

Embodiments of the present invention will now be described with respect to FIGS. 1 through 7. As discussed herein, embodiments of the present invention provide devices and methods for detecting the presence of a source of power. In some embodiments of the present invention, a communications circuit is configured to transmit a power line carrier status signal that may indicate a status of the source of power for a power distribution network. In other words, the power line carrier status signal may indicate the availability of a primary power source, the availability of a potential/backup (secondary) power source and/or a load. Furthermore, an outlet operatively associated with the power distribution network may be configured to receive the power line carrier status signal and provide a sensory indication responsive to the power line carrier status signal. The sensory indication may be, for example, a visual display or audible tone that may allow, for example, hospital personnel to obtain information about the status of power provided to the outlet. The availability of the sensory indication for a particular power outlet may allow, for example, hospital personnel, to differentiate between outlets having operable primary and/or secondary power sources and outlets that do not have operable primary and/or secondary power sources. Accordingly, improved devices for detecting the presence of a source of power may be provided as discussed further below.

Figure 1:
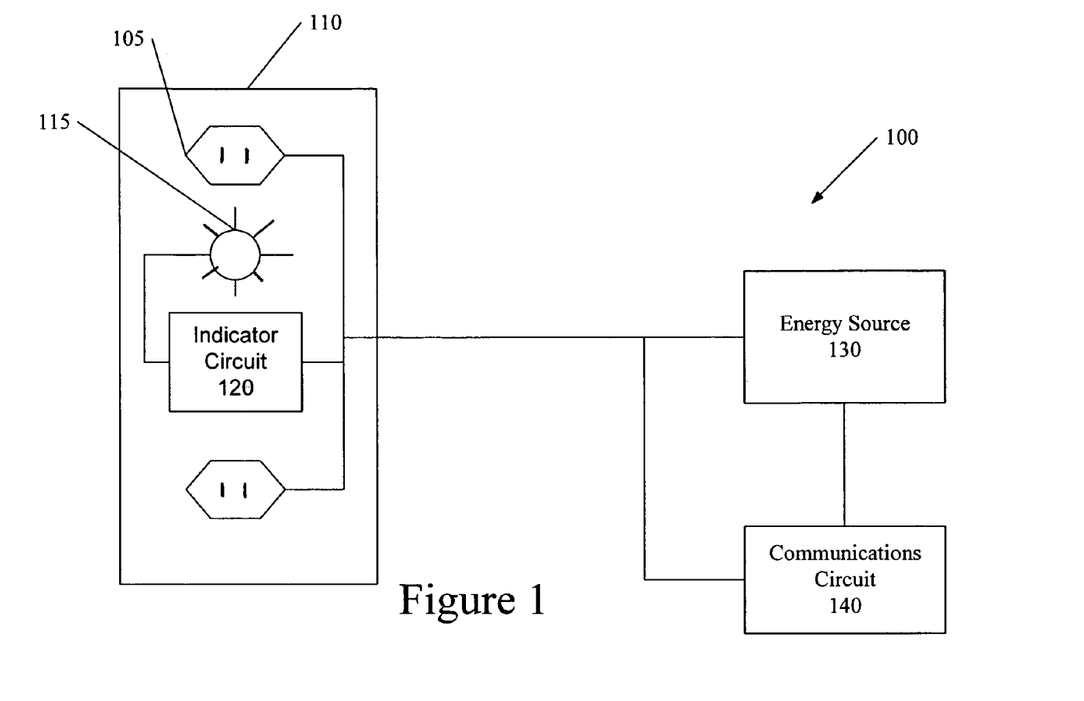
FIG. 1 is a schematic block diagram of systems including devices for detecting the presence of a source of power according to some embodiments of the present invention.

Referring now to FIG. 1, devices for detecting the presence of a source of power according to embodiments of the present invention will be discussed. A system 100 according to embodiments of the present invention is illustrated in FIG. 1. As illustrated, the system 100 includes a power outlet 105. The power outlet 105 may be attached to a frame 110 and provide access to a power distribution network. It will be understood that although embodiments of the present invention are discussed herein as including a frame 110, embodiments of the present invention are not limited to this configuration. The power distribution network distributes power provided by the energy source 130 between the devices and/or circuits in, for example, the system 100. As further illustrated in FIG. 1, the system further includes an indicator circuit 120. Although the indicator circuit 120 is illustrated as attached to or integrated with the frame 110 in FIG. 1, embodiments of the present invention are not limited to this configuration. It will be understood that, for example, the indicator circuit 120 may be separate from the frame 110 and still be electrically coupled to the outlet 105 without departing from the scope of the present invention.

The indicator circuit 120 is also coupled to the power distribution network and is configured to generate a sensory indication responsive to a power line carrier status signal received from the power distribution network. Power line carrier signals (PLCS) are signals sent on power lines of the power distribution network that allow circuits on the power distribution network to communicate information. The power line carrier status signal may indicate, for example, a source of energy for the power distribution network. The power line carrier status signal may be a low impact signal, such as an analog signal of from about 1 to about 5 Hertz or a digital bit stream, so that the power line carrier status signal does not unduly influence normal operations of the power distribution network. The power line carrier signal may also be a very large analog signal without departing from the scope of the present invention. In some embodiments of the present invention, the source of energy indicated by the power line carrier signal may be a current source of energy being provided to the power outlet 105 and/or a potential source of energy for the power outlet 105.

In further embodiments of the present invention, the current and/or potential sources of energy may be a primary source of energy for the power distribution network and/or a secondary source of energy for the power distribution network without departing from the scope of the present invention. The primary source of energy may be, for example, a commercial utility, and the secondary source of energy may be, for example, a battery, generator, fuel cell or the like. The primary source of energy and/or the secondary source of energy may be provided via an uninterruptible power supply (UPS) as illustrated, for example, in FIG. 6.

It will be understood that the indicator circuit 120 may be directly coupled to the power distribution network or wirelessly coupled to the power distribution network without departing from the scope of the present invention. For example, a wireless transmitter positioned in the UPS may communicate with a receiver at the power outlet 105.

The sensory indication generated by the indicator circuit 120 may include, for example, a visual indication and/or an audible indication. For example, a light source 115 may be attached to or integrated with the frame 110 and electrically coupled to the indicator circuit 120. The indicator circuit 120 may be configured to turn the light source 1115, for example, a light emitting diode (LED), on and/or off responsive to the power line carrier status signal. In certain embodiments of the present invention, a secondary source of power may be available to the outlet 105 if the light source 115 is turned on. It will be understood that embodiments of the present invention are not limited to this exemplary convention. For example, the availability of the secondary source of power may be indicated by turning the light source 115 off without departing from the scope of the present invention. It will be further understood that the light source 115 may be used to indicate the presence of both a primary source of power and a secondary source of power.

Figure 2:
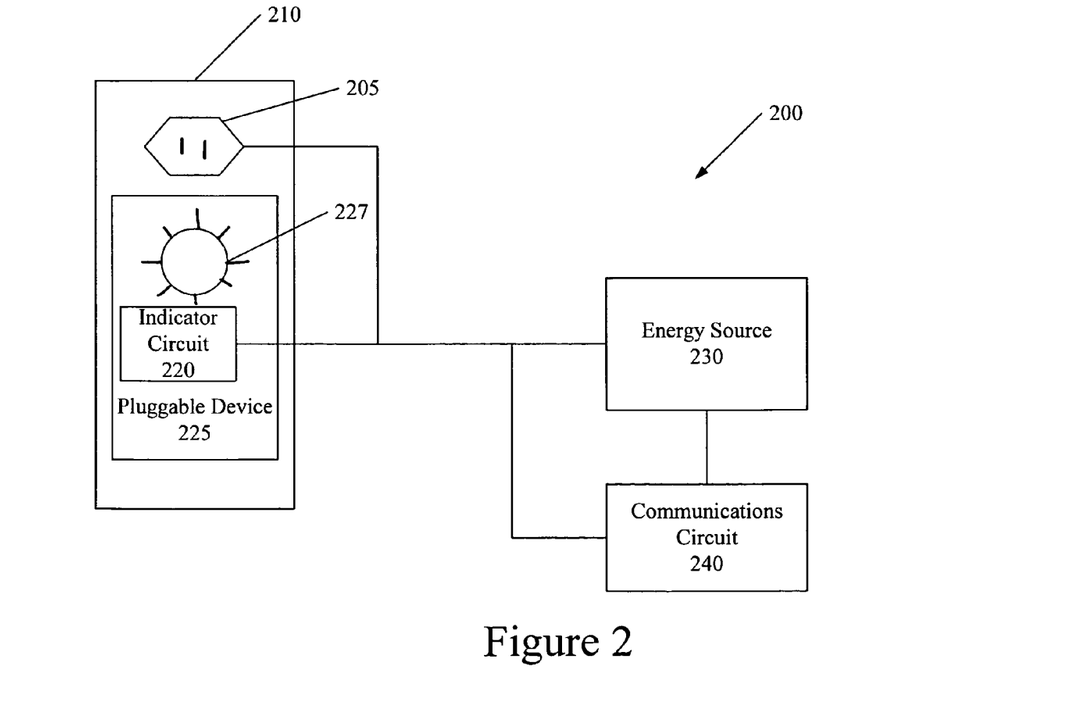
FIG. 2 is a schematic block diagram of systems including devices for detecting the presence of a source of power according to further embodiments of the present invention.
Figure 4:
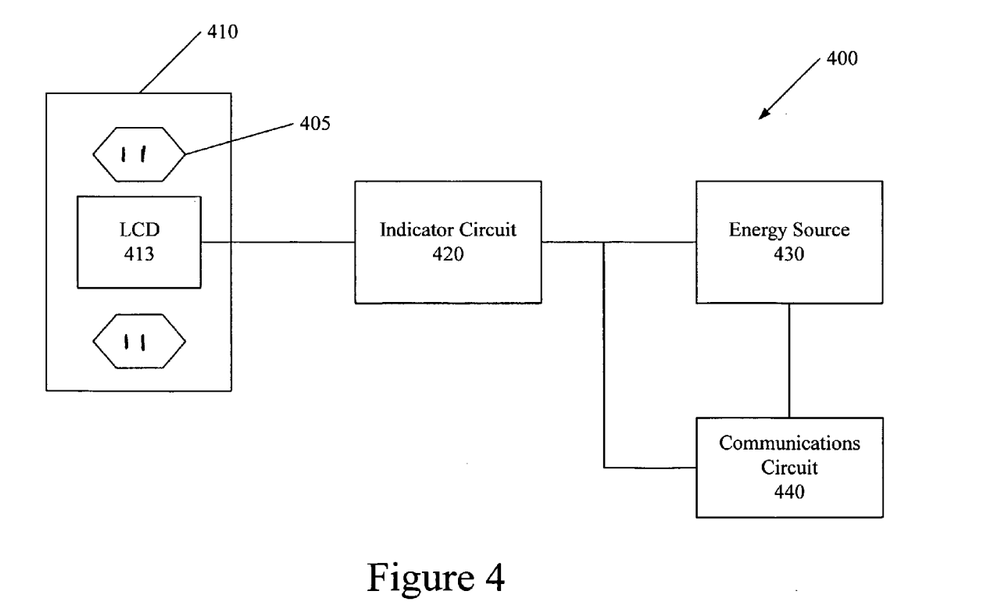
FIG. 4 is a schematic block diagram of systems including devices for detecting the presence of a source of power according to some embodiments of the present invention.

In some embodiments of the present invention, a light source 115 may not be integrated with the frame as illustrated, for example, in FIGS. 2 and 4. As shown in the system 200 of FIG. 2, the indicator circuit 220 integrated with an external pluggable device 225 may be configured to generate the sensory indication responsive to the power line carrier status signal. The pluggable device is not permanently attached to the frame 210. The pluggable device 225 may be configured to plug into the power outlet 205 so as to provide a constant indication of the status of power provided by the power distribution network to the power outlet 205. In certain embodiments of the present invention, the pluggable device 225 may include a light source 227 configured to indicate the status of power of an energy source 230 responsive to a power line carrier status signal generated by the communications circuit 240.

Figure 3:
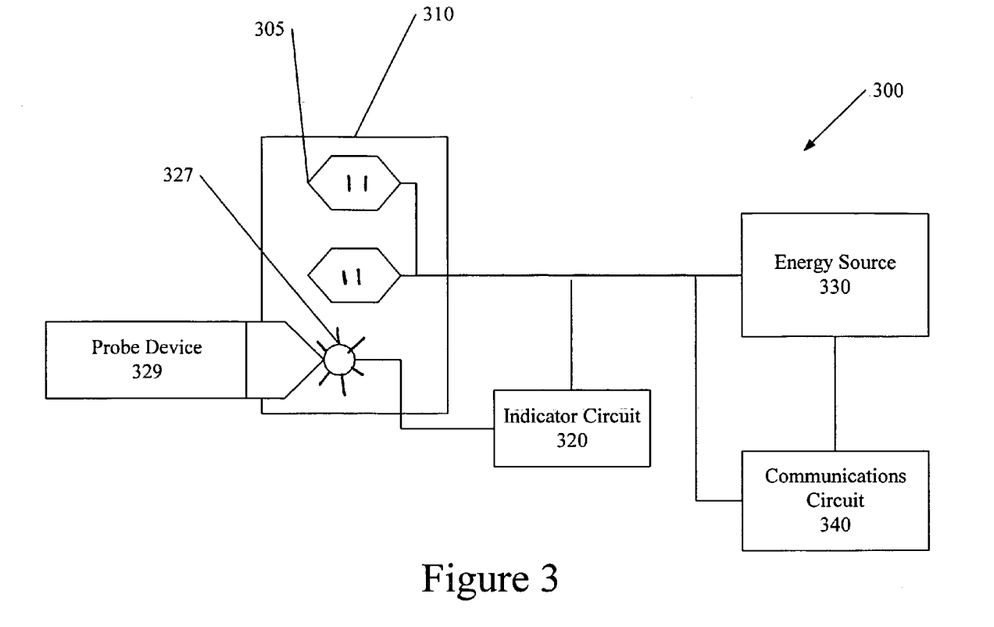
FIG. 3 is a schematic block diagram of systems including devices for detecting the presence of a source of power according to still further embodiments of the present invention.

In further embodiments of the present invention illustrated by the system 300 of FIG. 3, a probe device 329 may be configured to electrically couple the indicator circuit 320 when the probe device 329 contacts a portion of the frame 310 or the power outlet 305. Embodiments of the present invention using the probe device 329 may be used to test the power outlet 305 for a status of power delivered to the power outlet 305 by the energy source 330 responsive to a power line carrier status signal generated by a communications circuit 340. The probe device 329 may be used to test the outlet 305 before a critical machine, for example, a respirator, is plugged into the power outlet 305. The probe device 329 may include a light source 327 and may be configured to turn the light source 327 on if the power outlet 305 is power protected.

In still further embodiments of the present invention illustrated by the system 400 of FIG. 4, the indicator circuit 420 may include a liquid crystal display (LCD) 413 attached to or integrated with the frame 410. The indicator circuit 420 may be configured to cause display of a first color on the LCD 413 responsive to a first state of the power line carrier status signal generated by the communications circuit 440 and to cause display of a second color, different from the first color, responsive to a second state of the power line carrier status signal. The indicator circuit 420 may be further configured to cause the LCD 413 to blink and/or display a third color, different from the first and second colors, to indicate that the source of power being accessed, for example, energy source 430, by the power outlet 405 is temporary and a more permanent source of power should be obtained before the temporary source is fully depleted.

Although the LCD 413 of FIG. 4 is positioned between the power outlets 405 on the frame 410, embodiments of the present invention are not limited to this configuration. For example, a clear outlet cover may be placed over the outlets 405 and a LCD may be placed behind the clear outlet cover so light and color will shine through the clear outlet cover. For example, a red color may shine through if a backup power source is present and a yellow color for caution might shine through if a backup power source is not present. Furthermore, in certain embodiments of the present invention, the outlet 405 itself may include an LCD. The LCD may be front lit or backlit without departing from the scope of the present invention.

Although embodiments of the present invention illustrated in FIGS. 1 and 4 either include a light source 115 or an LCD 413, embodiments of the present invention are not limited to this configuration. For example, outlet assemblies according some embodiments of the present invention may include both a light source 115 and an LCD 413 integrated with the frame without departing from the scope of the present invention.

Referring again to FIG. 1, the energy source 130 may be a primary source, for example, a commercial utility or a secondary power source, for example, a battery or generator. The energy source 130 may be provided via, for example, a universal power supply (UPS) as discussed further below with respect to FIG. 5. As further illustrated in FIG. 1, the system 100 further includes a communications circuit 140. The communications circuit 140 may be operatively associated with the energy source 130 and may be configured to generate the power line carrier status signal responsive to the status of power provided by the energy source 130. As discussed above, the power line carrier status signal may be indicative of a status of power delivered to the power distribution network by the energy source 130.

For example, the energy source 130 may be a device configured to provide alternative sources, such as a UPS. For example, when the UPS has a primary source of power available to the power outlet 105, the communications circuit 140 may be configured to generate a power line carrier status signal having a first state. The indicator circuit 120 may receive the power line carrier status signal having the first state, demodulate the received signal and provide a sensory indication responsive to the received signal that indicates the availability of the primary power source. Furthermore, when the UPS has a secondary source of power available to the power outlet 105, the communications circuit 140 may be configured to generate a power line carrier status signal having a second state. The indicator circuit 120 may receive the power line carrier status signal having the second state, demodulate the received signal and generate a sensory indication responsive to the received signal that indicates the availability of the secondary power source. In other words, the sensory indication may indicate to, for example, hospital personnel, that a primary source of power is available at the outlet 105, a secondary source of power source of power is available at the outlet and/or the load being carried by the outlet.

It will be understood that when the primary and/or secondary source is not indicated as available by a sensory indication, i.e., the power line carrier status signal having the first and/or second state has not been received at the indicator circuit 120, the primary and/or secondary source may be unavailable. It will be further understood that the communications circuit 140 may be further configured to generate power line carrier status signals to positively indicate the unavailability of the primary and secondary sources of power without departing from the scope of the present invention.

Although the communications circuit 140 of FIG. 1 is illustrated as a separate circuit from the energy source 130, embodiments of the present invention are not limited to this configuration. As illustrated, for example, in FIG. 5, the communications circuit 540 may be integrated with the energy source, for example, UPS 530, without departing from the scope of the present invention.

Figure 5:
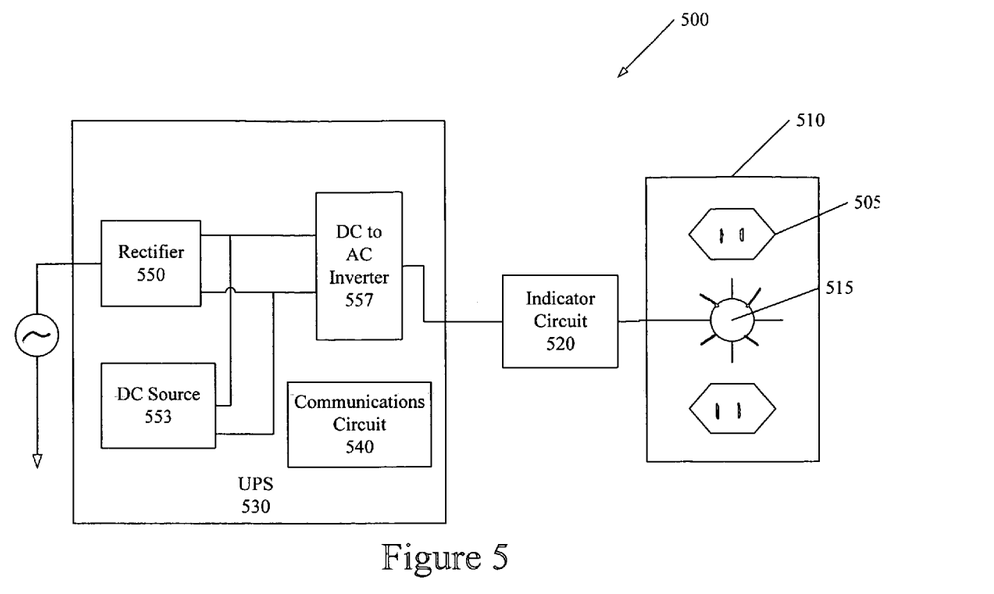
FIG. 5 is a schematic block diagram of systems including devices for detecting the presence of a source of power according to further embodiments of the present invention.

Now referring to FIG. 5, a schematic block diagram of systems 500 including devices for detecting the presence of a source of power according to embodiments of the present invention will be discussed. An apparatus, for example, a UPS 530, is provided having a communications circuit 540 integrated therein. As discussed above, the communications circuit 540 is operatively associated with the UPS 530 and is configured to generate the power line carrier status signal on a power distribution network. As discussed above, the power line carrier status signal identifies a source of power for the power distribution network.

The uninterruptible power supply (UPS) 530 is a device that allows equipment plugged into, for example, a power outlet 505 to keep running for at least a short time when the primary power source of power is lost. The UPS 530 may also provide for protection from power surges. An on-line UPS typically includes a rectifier circuit 550 for providing direct current (DC) voltage from the alternating current (AC) power distribution network. An inverter 557 is also provided for converting (inverting) the DC voltage back to an AC voltage for delivery to the power distribution network. As further illustrated, UPSs may further include a DC source 553, for example, a battery or a generator. A battery connection circuit (not shown) may also be included to connect the battery power to the input of the DC to AC inverter 557, so that when reliable AC power is lost the delivery of AC power to the power distribution network is substantially unaffected. It will be understood that while FIG. 5 illustrates an on-line UPS, embodiments of the present invention may also be used with and/or in other types of UPSs, including, for example, standby and line interactive UPSs.

It will be further understood that in, for example, a hospital environment, a UPS system is backed up by a generator and, thus, may provide a secondary source of power for as long as necessary until the primary source of power is reinstated. However, if the UPS only provides a battery backup to the primary source of power, a UPS having a communications circuit 540 according to embodiments of the present invention may be configured to notify hospital personnel of the temporary nature of the backup power source so that a more reliable secondary source of power may be obtained. For example, the communications circuit 540 may be configured to transmit a power line carrier status signal to the indicator circuit 520 indicating that the secondary source of power is a limited source of power. The indicator circuit 520 may receive the signal, demodulate it and cause the light source 515 to blink so as to indicate the temporary nature of the secondary power source to hospital personnel.

In some embodiments of the present invention, the UPS 530 may be inserted between the primary power source of power, such as a commercial utility, and the primary power input (power outlet 505) of equipment to be protected, e.g., a respirator in hospital. In the event of an interruption in the primary power, the DC source (battery) 553 takes over without losing a fraction of a cycle in the AC output of the UPS. The battery 553 may also provide protection against transients. The duration of the longest outage for which protection is ensured depends on the battery capacity, and to a certain degree, on the rate at which the battery is drained. As discussed above, certain UPS systems may include generator backups, which may provide an extended source of secondary power.

Figure 6:
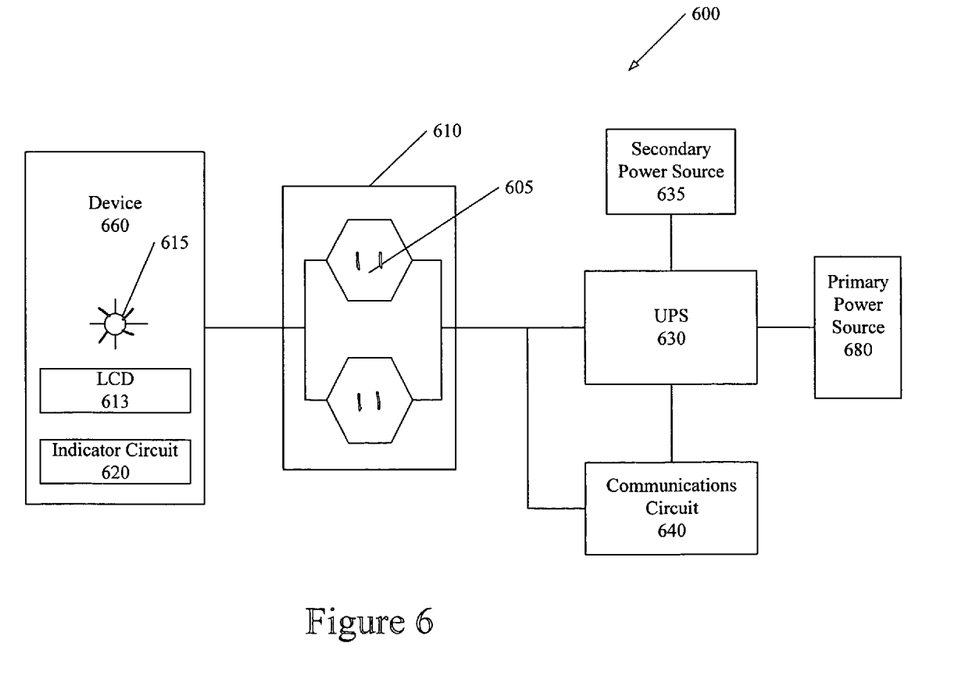
FIG. 6 is a schematic block diagram of systems including devices for detecting the presence of a source of power according to further embodiments of the present invention.

Referring now to FIG. 6, systems 600 including devices for detecting the presence of a source of power according to embodiments of the present invention will be discussed. In some embodiments of the present invention, the indicator circuit 620 may be included within a device 660, for example, a respirator. Accordingly, the device 660 may have, for example, a light source 615 integrated therewith. As discussed above, the light source 615 is operatively associated with the indicator circuit 620. The indicator circuit may be configured to generate a sensory indication in response to a power line carrier status signal generated by the communications circuit 640. The power line carrier status signal indicates the status of power provided by a primary source of power 680 or a secondary source of power 635 or both. The secondary source of power 635 may be, for example, a utility, a battery, a generator or the like.

It will be understood that the device may further include a liquid crystal display 613 as discussed above, which may be configured to display different colors, words, graphics and the like to indicate the status of power of the power distribution network. The device 660 including the indicator circuit 620 according to embodiments of the present invention may be electrically coupled to the power distribution network by plugging the device 660 into the power outlet 605.

Figure 7:
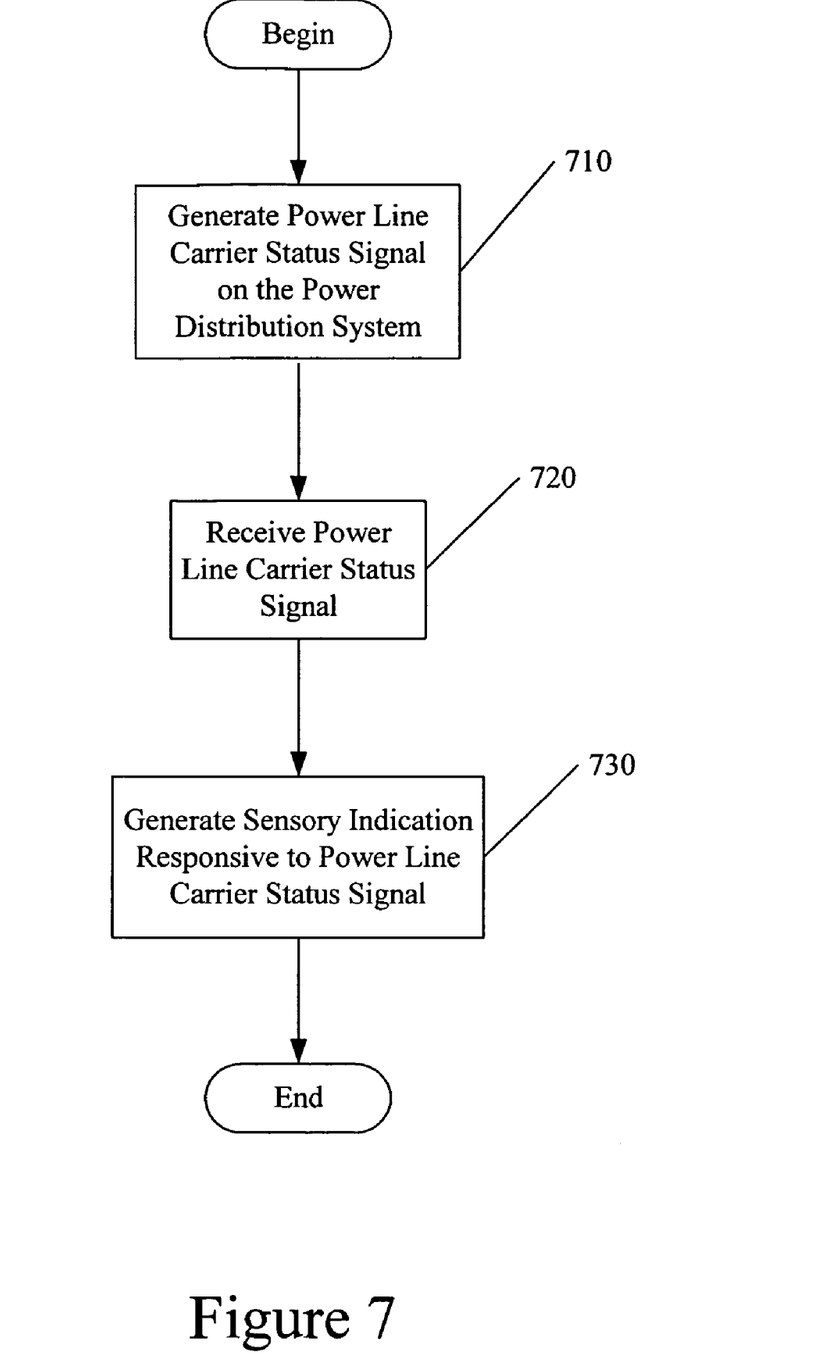
FIG. 7 is a flowchart illustrating exemplary operations of systems including devices for detecting the presence of a source of power according to some embodiments of the invention.

Referring now to FIG. 7, operations of devices for detecting a source of power according to embodiments of the present invention will be discussed. Operations begin at block 710 by generating a power line carrier status signal responsive to a status of the source of energy for the power distribution network on the power distribution network. The power line carrier status signal indicates the status of the source of power provided to a power distribution network. The power line carrier status signal may be generated by a communications circuit. The communications circuit may be operatively associated with the power distribution network and a power source for the power distribution network. The power line carrier status signal may be received and demodulated (block 720) by, for example, an indicator circuit. The indicator circuit may be attached to a power outlet or integrated with a device, for example, a respirator. A sensory indication may be generated responsive to the received power line carrier status signal (block 730). For example, a first color may be generated on a liquid crystal display to indicate detection of the power line carrier status signal having a first state and a second color may be generated on the liquid crystal display, different from the first color, to indicate detection of the power line carrier status signal having a second state.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A power outlet assembly, comprising:
   a frame;
   a power outlet attached to the frame and configured to be connected to a power distribution network to provide access thereto; and
   an indicator circuit attached to the frame, configured to be coupled to the power distribution network and operative to generate a sensory indication responsive to a power line carrier status signal received from the power distribution network, the power line carrier status signal indicating a status of a source of energy for the power distribution network.

2. The power outlet assembly of claim 1 wherein the power line carrier status signal relates to an uninterruptible power supply (UPS).

3. The power outlet of claim 1 wherein the source of energy comprises at least one of a current source of energy and a potential source of energy.

4. The power outlet of claim 1 wherein the power line carrier status signal comprises a low impact signal and wherein the low impact signal comprises at least one of an analog signal and a digital bit stream.

5. The power outlet assembly of claim 1 wherein the indicator circuit comprises a liquid crystal display and wherein the liquid crystal display is configured to display a first color responsive to a first state of the power line carrier status signal and display a second color, different from the first color, responsive to a second state of the power line carrier status signal.

6. The power outlet assembly of claim 1, wherein the indicator circuit comprises an audio circuit.

7. A power outlet comprising an indicator circuit, the indicator circuit being coupled to a power distribution network and configured to generate a sensory indication responsive to a power line carrier status signal received from the power distribution network, the power line carrier status signal indicating a status of a source of energy for the power distribution network.

8. The power outlet of claim 7 wherein the source of energy comprises at least one of a current source of energy and a potential source of energy.

9. The power outlet of claim 7 wherein the indicator circuit is further configured to generate the sensory indication responsive to the power line carrier status signal when the indicator circuit electrically contacts an external probe device.

10. The power outlet of claim 7 wherein the power line carrier status signal comprises a low impact signal and wherein the low impact signal comprises at least one of an analog signal and a digital bit stream.

11. The power outlet of claim 7 wherein the indicator circuit comprises a liquid crystal display and wherein the liquid crystal display is configured to display a first color responsive to a first state of the power line carrier status signal and display a second color, different from the first color, responsive to a second state of the power line carrier status signal.

12. The power outlet of claim 7 wherein the indicator circuit comprises an audio circuit.

* * * * *

(12) EX PARTE REEXAMINATION CERTIFICATE (8046th)
United States Patent
Finan et al.

(10) Number: US 7,129,822 C1
(45) Certificate Issued: Feb. 22, 2011

(54) DEVICES FOR DETECTING THE PRESENCE OF A SOURCE OF POWER

(75) Inventors: Darrick Finan, Cary, NC (US); Jim Thompson, Raleigh, NC (US); Greg Mears, Raleigh, NC (US)

(73) Assignee: Eaton Corporation, Cleveland, OH (US)

Reexamination Request:
No. 90/010,446, Mar. 24, 2009

Reexamination Certificate for:
Patent No.: 7,129,822
Issued: Oct. 31, 2006
Appl. No.: 10/790,961
Filed: Mar. 2, 2004

(51) Int. Cl.
*G05B 11/01* (2006.01)

(52) U.S. Cl. ................. 340/310.11; 340/538; 340/693.1; 361/797; 714/14

(58) Field of Classification Search ............... None
See application file for complete search history.

(56) References Cited

U.S. PATENT DOCUMENTS

2002/0024332 A1  2/2002  Gardner
2003/0147262 A1  8/2003  Germagian et al.

OTHER PUBLICATIONS

Communication pursuant to Article 94(3) EPC, European Application No. 05 723 985.7, Apr. 23, 2009, 3 pages.
Third Office Action, Chinese Patent Application No. 2005800066205, Aug. 28, 2009, 28 pages.

*Primary Examiner*—Joseph R Pokrzywa (57) ABSTRACT

An apparatus is provided that includes an uninterruptible power supply (UPS) configured to be connected to a power distribution network. A communications circuit is also provided. The communications circuit is operatively associated with the UPS and operative to generate a power line carrier status signal on the power distribution network. The power line carrier status signal is indicative of a status of power delivered to the power distribution network by the UPS. Related methods of operating such apparatus are also provided.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

* * * * *